No. 873,033.         PATENTED DEC. 10, 1907.
T. J. DUNNING.
LAWN MOWER.
APPLICATION FILED SEPT. 15, 1906.
2 SHEETS—SHEET 1.
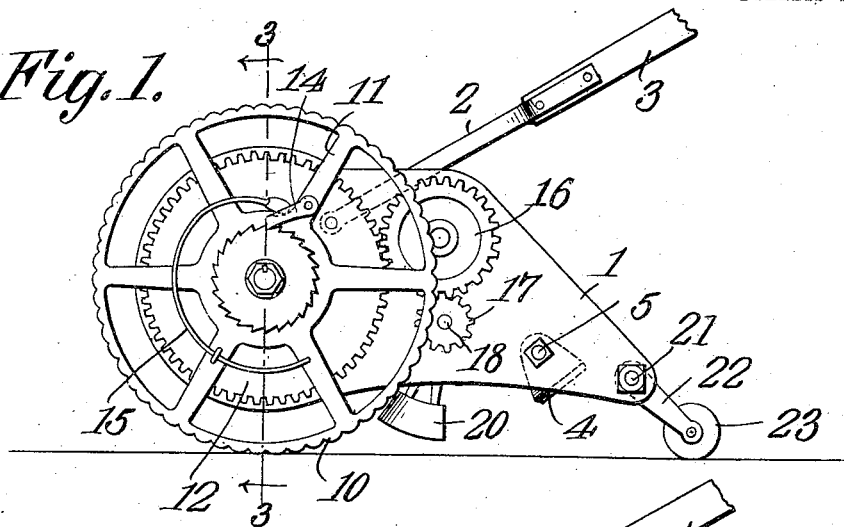
Fig. 1.
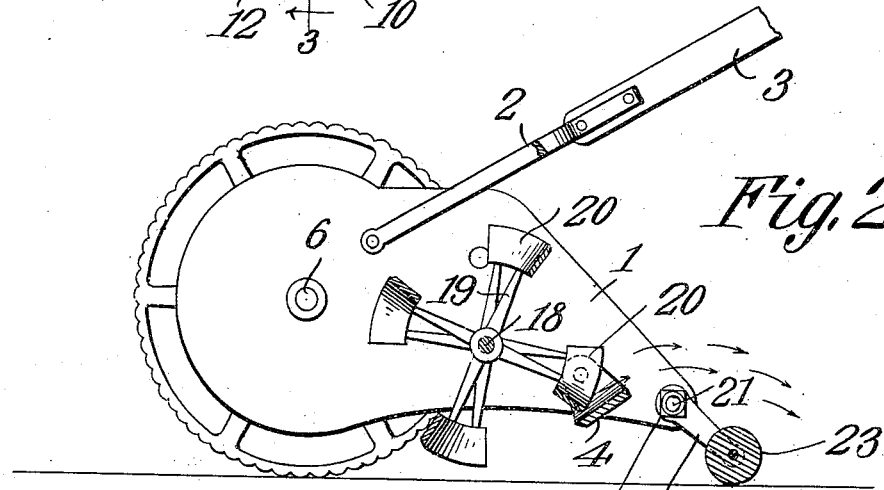
Fig. 2.
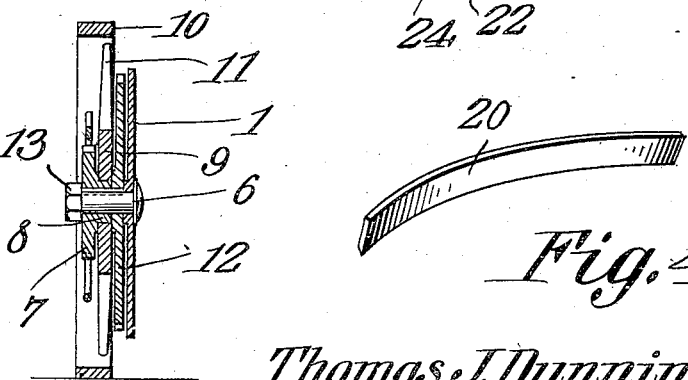
Fig. 3.
Fig. 4.
WITNESSES:
Thomas J. Dunning,
INVENTOR.
By C. A. Snow & Co.
ATTORNEYS No. 873,033. PATENTED DEC. 10, 1907.
T. J. DUNNING.
LAWN MOWER.
APPLICATION FILED SEPT. 15, 1906.
2 SHEETS—SHEET 2.
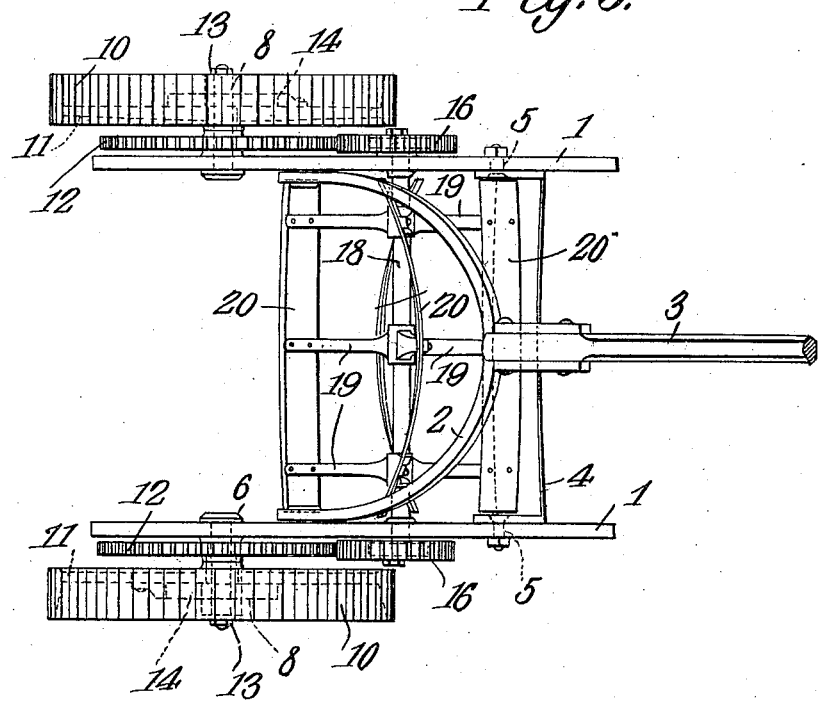
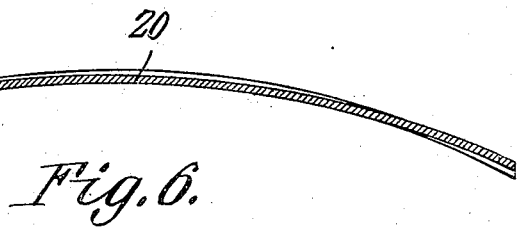
WITNESSES:
Thomas J. Dunning,
INVENTOR.
By C. A. Snow & Co.
ATTORNEYS

UNITED STATES PATENT OFFICE.

THOMAS J. DUNNING, OF CHATFIELD, MINNESOTA.

LAWN-MOWER.

No. 873,033.     Specification of Letters Patent.     Patented Dec. 10, 1907.

Application filed September 15, 1906. Serial No. 334,714.

*To all whom it may concern:*

Be it known that I, THOMAS J. DUNNING, a citizen of the United States, residing at Chatfield, in the county of Fillmore and State of Minnesota, have invented a new and useful Lawn-Mower, of which the following is a specification.

This invention relates to lawn mowers.

The objects of the invention are to improve and simplify the construction of such devices; furthermore, to increase their efficiency in operation and to decrease the expense attending their manufacture.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings forming part of this specification:—Figure 1 is a side elevation of a lawn mower constructed in accordance with the present invention; Fig. 2 is a vertical section; Fig. 3 is a section on the line 3—3 of Fig. 2; Fig. 4 is a perspective view of one of the cutter blades curved from end to end on the segment of a circle; Fig. 5 is a plan view of the mower; and Fig. 6 is an edge view of one of the cutter blades.

Like reference numerals indicate corresponing parts in the different figures of the drawings.

The frame of the improved lawn mower preferably consists of a pair of side members 1 which are connected with each other adjacent their forward ends by means of the yoke 2 of a handle 3. Adjacent their rear ends the side members 1 are connected with each other by means of a stationary cutter bar 4 which is curved from end to end on the segment of a circle and is bolted or otherwise suitably secured to the side members as indicated at 5.

Rotatably mounted in each of the side members 1 is an outwardly-extending stud shaft 6. Keyed or otherwise suitably fixed upon the outer end of each stud shaft 6 is a ratchet wheel 7 which is formed with an inwardly-extending hub or sleeve portion 8. Loosely surrounding the hub or sleeve portion 8 of the ratchet wheel 7 is the hub 9 of a ground wheel 10 which is provided with spokes 11. Keyed or otherwise suitably fixed upon the stud shaft 6 between the hub 9 of the ground wheel 10 and the side member 1 is a gear wheel 12 which serves to hold the hub 9 of the ground wheel 10 in proper position upon the sleeve portion 8 of the ratchet wheel 7. The ratchet wheel 7 is held upon the stud shaft 6 by means such as the nut 13.

Pivotally mounted upon one of the spokes 11 of the ground wheel 10 is a pawl 14 which is pressed into engagement with the ratchet wheel 7 by means such as the volute spring 15 carried by the ground wheel 10. It will be obvious that as the lawn mower is pushed along the ground, the rotation of the ground wheel 10 will be communicated through the pawl 14 to the ratchet wheel 7 which, in turn, will rotate the gear wheel 12. The rotation of the intermediate gear wheel 12 is transmitted to an idle gear wheel 16 journaled upon the side member 1 and meshing with a small gear wheel 17 which is rigidly mounted upon the end of a cutter shaft 18. It will be understood that the arrangement of stud shaft 6 and ratchet and gear wheels illustrated in Fig. 3 is duplicated on the two side members 1 of the lawn mower.

Radiating from the cutter shaft 18 is a plurality of arms 19. Connected with each set of arms 19 is a cutter blade 20 which is curved from end to end thereof on the segment of a circle, as illustrated in Fig. 4. During rotation, the cutter blades 20 coöperate with the cutter bar 4 to cut the grass. The peculiar shape of the cutter blades 20 constitute a valuable improvement of the present invention over lawn mowers which are provided with ordinary spiral cutter blades in that the segmentally curved blades of the present invention serve to throw the cut grass directly backward from the machine and do not deflect it to one side or the other as is nearly always the case with the spiral blades. The segmentally curved blades, as they approach the cutter bar 4, have a tendency to gather in the grass toward the center of the machine so that none of the cut grass will be thrown into contact with the wheels.

Secured to the rear end of each side member 1 of the machine frame is a bolt 21 with which is pivotally connected an arm 22. Journaled between the two arms 22 at the rear end of the machine is a gage roller 23. For the purpose of holding the pivotal arms 22 in any adjusted position so as to regulate the position of the gage roller 23, the bolts 21 are provided with tightening nuts 24 which can be screwed against the arms 22 so as to hold them stationary.

The improved lawn mower of the present invention is strong, simple, durable and inexpensive in construction as well as thoroughly efficient in operation.

What is claimed is:—

1. A lawn mower consisting of a wheel supported frame, a shaft revolubly mounted within the frame, means for transmitting motion thereto from one of the supporting wheels, arms radiating from the shaft, a series of cutter blades carried by the arms, and disposed in lines substantially radial to the axis of rotation each of said blades being formed of a flat strip of metal bowed from end to end, all parts of each blade being straight in cross section, the outer longitudinal edge of each blade being sharpened, and a cutterbar supported within and extending transversely of the frame, said bar having a longitudinal edge sharpened and coöperating with the cutting edges of the blades.

2. A lawn mower having a frame consisting of side members, a handle having a yoke connecting said side members near their forward ends, a stationary cutter bar connecting said side members adjacent their rear ends, a stud shaft rotatably connected with each of said side members, a ratchet wheel fixed on each stud shaft and having a sleeve portion, a ground wheel loosely mounted on said sleeve portion and having a spring-operated pawl engaging the said ratchet wheel, a gear wheel fixed on each stud shaft between the ground wheel and the side member for holding the ground wheel on the sleeve portion of the ratchet wheel, an idle gear wheel journaled on each side member, a cutter shaft having a small gear wheel meshing with said idle gear wheel, radial arms on said cutter shaft, cutter blades connected with said radial arms and each curved from end to end on the segment of a circle, arms pivotally connected with the rear ends of said side members, a gage roller journaled upon said pivotal arms, and nuts for holding said pivotal arms in adjusted position.

In testimony that I claim the foregoing as my own, I have hereto affixed my signature in the presence of two witnesses.

THOMAS J. DUNNING.

Witnesses:
   ALEX MITCHELL,
   J. P. WILLIAMS.